No. 786,834. PATENTED APR. 11, 1905.
F. J. NUTTING.
PUNCHING MACHINE.
APPLICATION FILED JUNE 19, 1903.
6 SHEETS—SHEET 1.
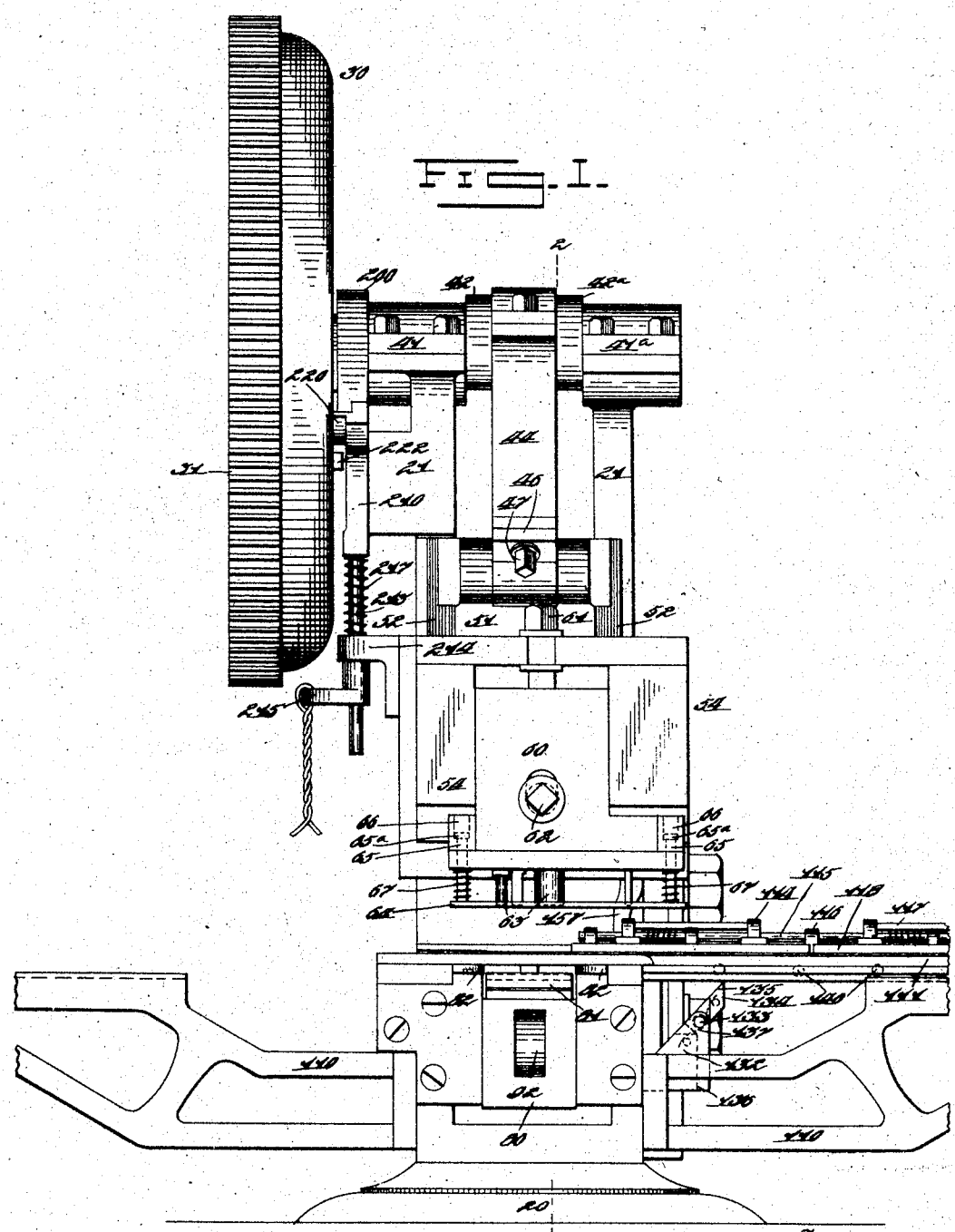

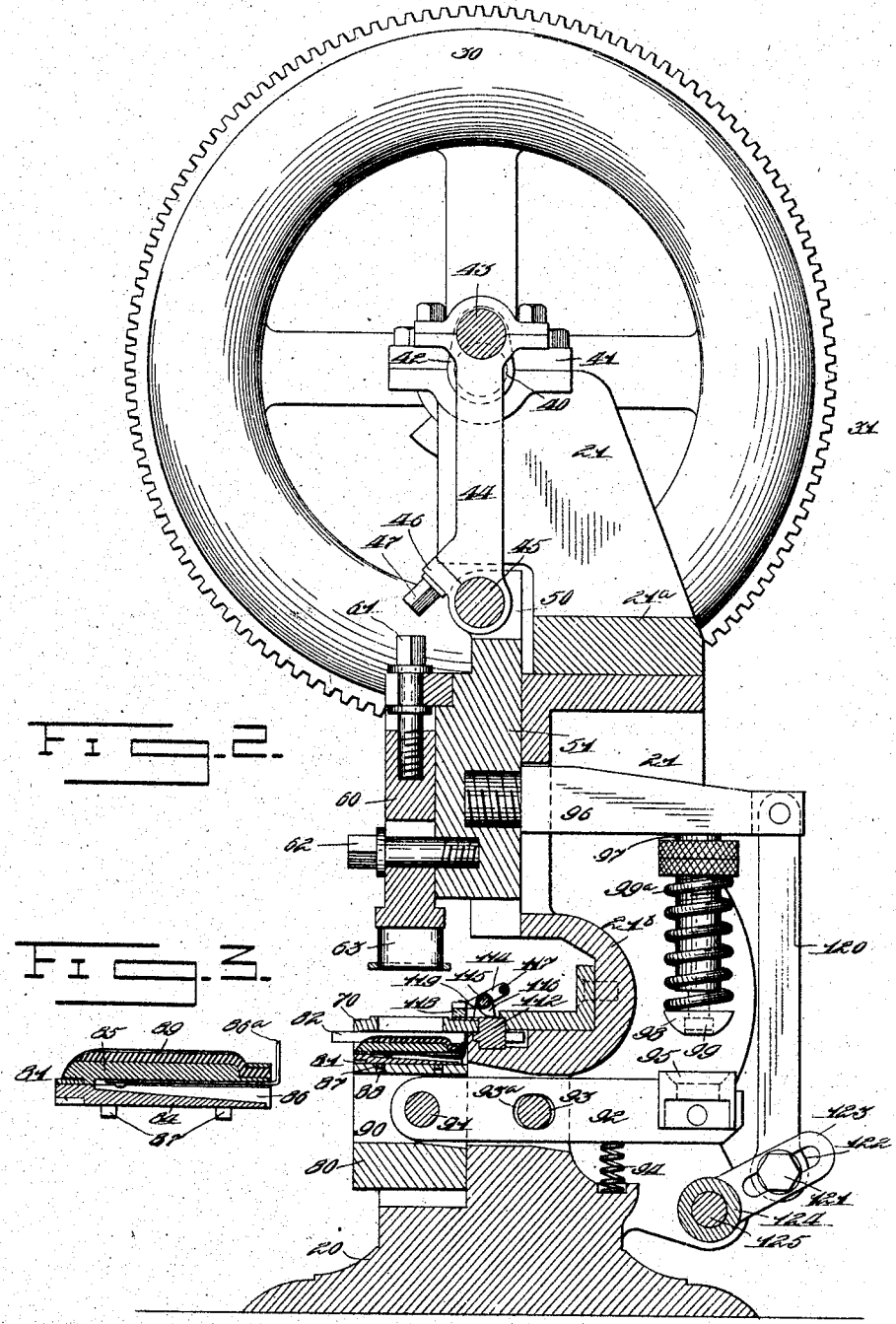

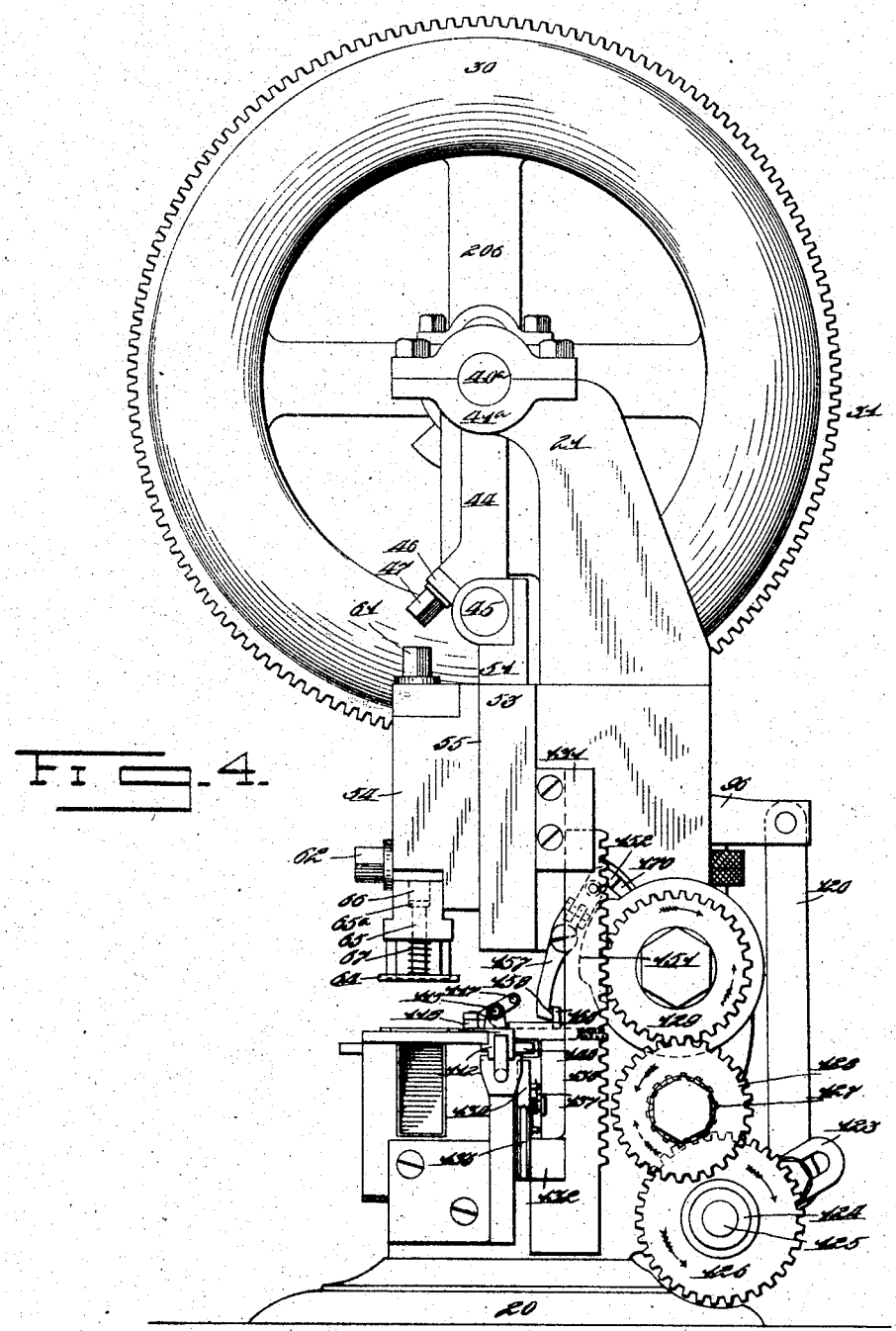

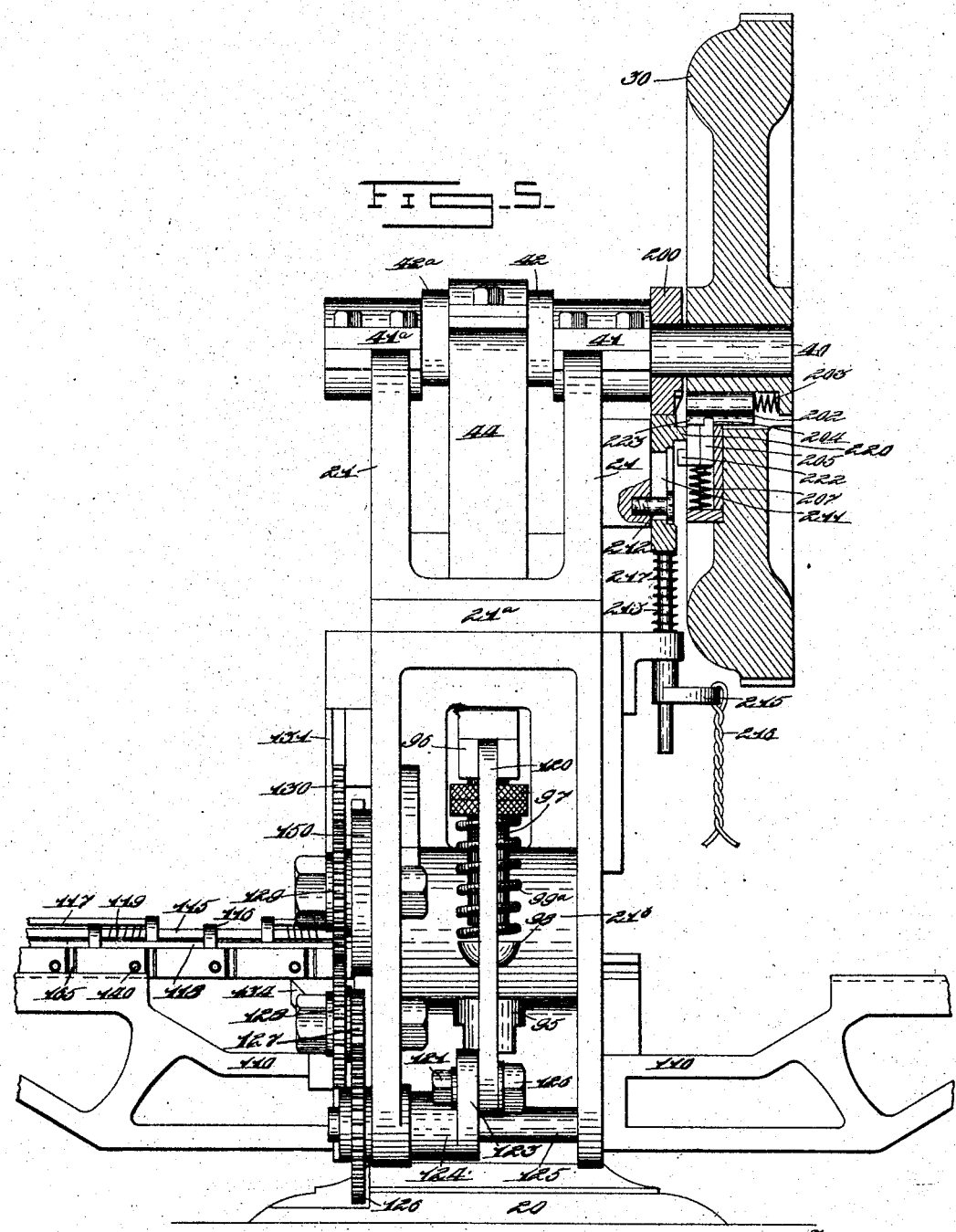

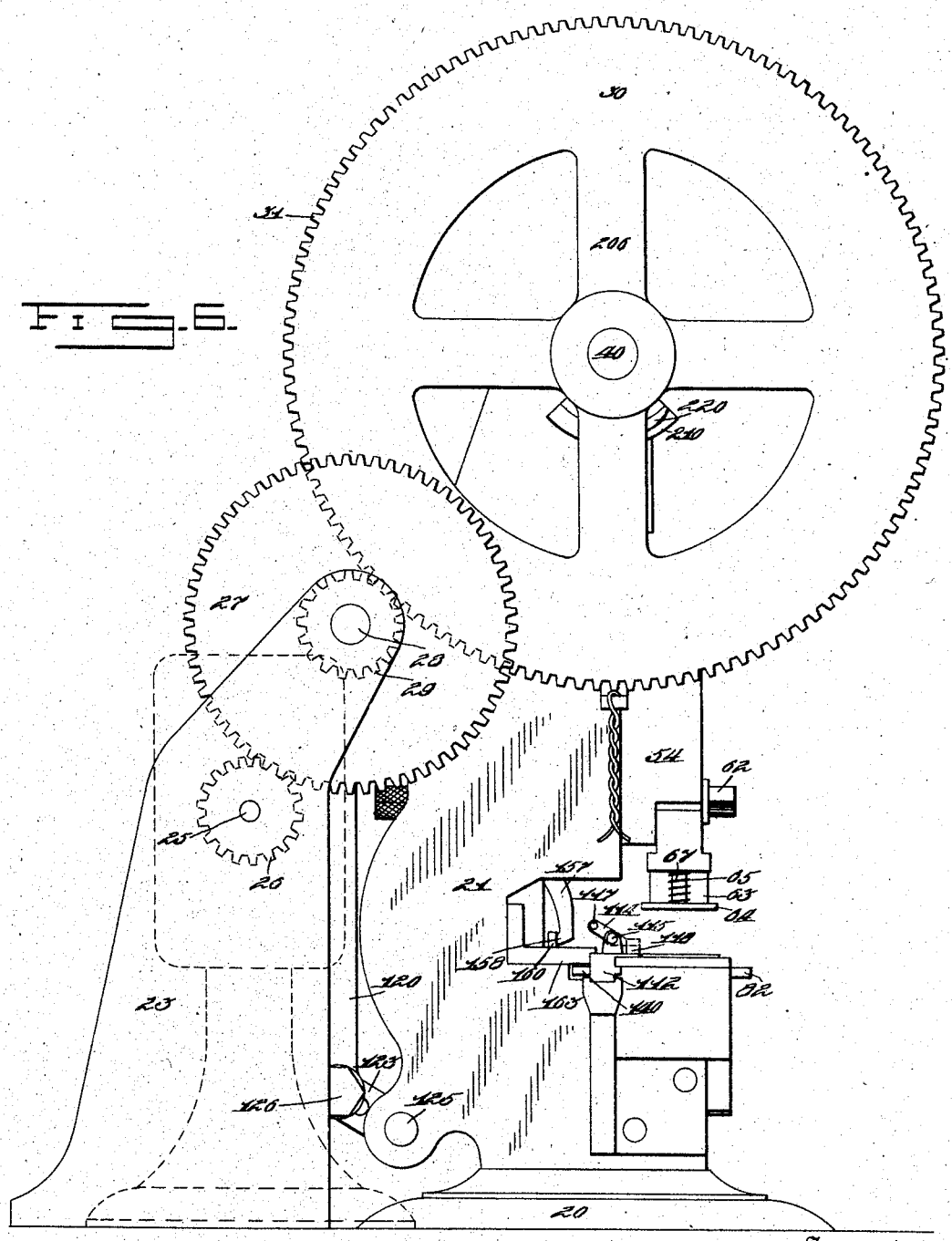

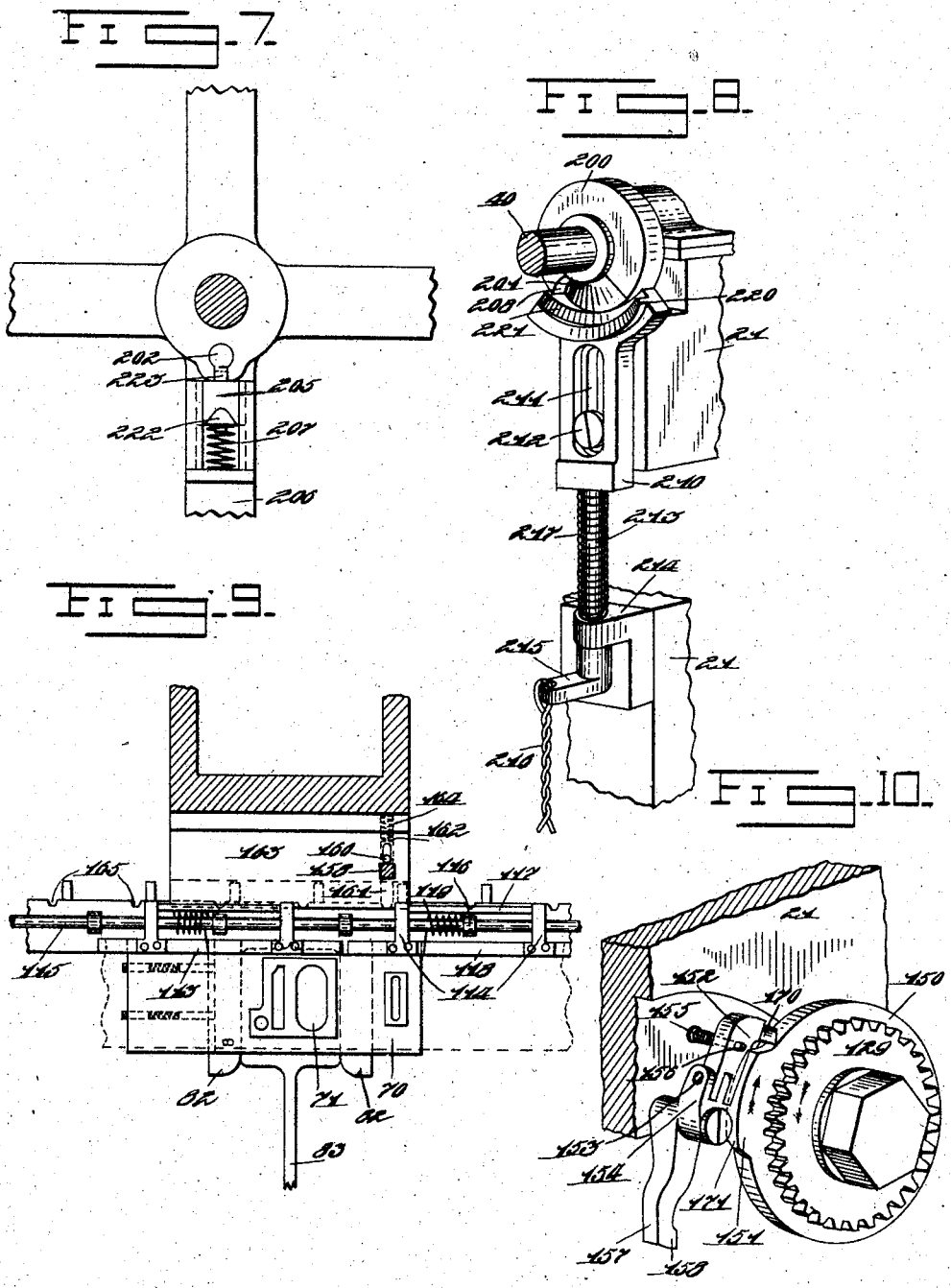

No. 786,834. Patented April 11, 1905.

UNITED STATES PATENT OFFICE.

FREDERICK J. NUTTING, OF DAYTON, OHIO, ASSIGNOR TO NATIONAL CASH REGISTER COMPANY, OF JERSEY CITY, NEW JERSEY, A CORPORATION OF NEW JERSEY.

PUNCHING-MACHINE.

SPECIFICATION forming part of Letters Patent No. 786,834, dated April 11, 1905.

Application filed June 19, 1903. Serial No. 162,195.

*To all whom it may concern:*

Be it known that I, FREDERICK J. NUTTING, a citizen of the United States, residing at the city of Dayton, in the county of Montgomery and State of Ohio, have invented certain new and useful Improvements in Punching-Machines, of which I declare the following to be a full, clear, and exact description.

My invention relates to that class of machines in which certain material is cut into any desired shape or configuration by means of a punch and die; and it has for its object and purpose to devise an improved method for rapidly and accurately impressing these cut-out configurations upon any desired surfaces or work.

In the accompanying drawings, Figure 1 represents a front elevation of the machine. Fig. 2 is a cross-sectional side elevation through the line 2 2 in Fig. 1. Fig. 3 is a detail sectional view of part of the work-support. Fig. 4 is a side elevation looking from the right in Fig. 1. Fig. 5 is a rear elevation showing also a cross-section of the main driving-wheel and the clutch mechanism. Fig. 6 is a side elevation looking from the left of Fig. 1, showing means for transmitting power to the main driving-wheel of the machine. Fig. 7 is a fragmentary detail view of the main driving-wheel, showing the clutch-pin. Fig. 8 is a detail perspective view of the clutch-operating mechanism. Fig. 9 is a fragmentary detail top view of the material-carriage and its locking-pin, and Fig. 10 is a detail perspective view of the unlocking-pawl for the material-carriage.

In the general operation of the preferred form of embodiment of this machine as herein described a punch is caused to reciprocate back and forth through a stationary die. Material is fed across the face of the die the punch thereupon cuts out the material into a certain shape or configuration and forces this cut-out configuration through the die and impresses it upon work held firmly below the die. Such a process is particularly adaptable where the material so cut out is adhesive paper and the work is previously moistened by any suitable means, in which case the proper configurations being impressed upon the moistened work adhere thereto permanently, and as a separate piece of work may be inserted or fed below the die at each reciprocation of the punch the result is the rapid production of pieces of work on the surface of each of which are pasted or attached configurations or characters of the same shape and size.

The operative parts of the machine are supported upon a base-block 20 and two upright standards or side frames 21, connected by tie-blocks $21^a$ and $21^b$. Mounted loosely upon a shaft 40, journaled in a bearing 41 in the upright standard 21, is a large fly-wheel or driving member 30, and motive power is imparted to this driving member by means of gears. (Shown in Fig. 6.) Journaled in an upright support 23 is a shaft 25, which is rotated by means of an electric motor, shown in dotted lines, or by any other suitable means. This shaft 25 has fast upon its outer end a gear-wheel 26, which meshes with a larger gear-wheel 27, fast upon a shaft 28, mounted between upright supports 23, and said shaft 28 has fast upon it a smaller gear-wheel 29, which meshes with teeth 31 upon the periphery of the large wheel 30. It is thus obvious that upon the continuous rotation of shaft 25 a continuous rotation is imparted to the large wheel 30, and by means of a clutch mechanism or stop-motion, to be hereinafter described, this driving-wheel 30 is connected with a shaft or "driven member" 40 (see Figs. 2 and 5) to import rotation thereto and is disconnected therefrom at a certain point in the revolution of said shaft 40.

*Punch and die.*—The shaft 40 is journaled in the bearing 41, as before described, and extends through to the inner side of the standard 21, where it is made fast to a crank 42. (See Figs. 2 and 5.) Upon the outer end of this crank 42 is a crank-pin 43, which extends parallel to the shaft 40 and is connected to the outer end of a second crank $42^a$, which is fast upon another shaft, $40^a$, in alinement with shaft 40 and journaled in a bearing $41^a$ in the other upright standard, 21. Journaled upon the crank-pin 43 and between the two cranks 42 and 42ᵃ is a pitman or connecting-rod 44, the lower end of which is connected to a crosshead pin 45 by means of a strap 46 and bolt 47. This cross-head pin 45 is supported between two upright arms 50, which are attached to a cross-head 51. (See Figs. 1 and 2.) The cross-head 51 is formed upon its sides with beveled surfaces 52, which slide upon corresponding beveled surfaces formed in guide-plates 53, attached to the side frame 21. The cross-head is formed upon its forward side with a block 54, adapted to receive and hold the punch-holder, as hereinafter described, the outer edges of which block slide upon the flat forward surfaces 55 of the same guide-plates 53. (See Fig. 4.) By this means the cross-head is held in its vertical path during reciprocation, which reciprocation is effected in a well-known manner by the rotation of the shaft 40 and through the crank and pitman mechanism.

The block 54 upon the cross-head 51 carries a detachable punch-holder 60, which is inserted into the cross-head from the front and is firmly held in position by bolts 61 and 62. Upon the under side of the punch-holder 60 are rigidly seated punches 63, formed in any desired shape or configuration, and when it is desired to change to a punch of different shape the entire punch-holder 60 is removed from the cross-head block 54 by loosening the bolts 61 and 62 and a new punch-holder is inserted. A stripper-plate 64 is attached to the lower part of the punch-holder by means of pins 65, which are seated within recesses 66 in the punch-holder 60. This stripper-plate is punched out with configurations of exactly the same shape as the punches 63 in such manner that it will fit closely to said punches and be vertically slidable thereon. The stripper-plate is normally held at the outer ends of the punches 63 by means of springs 67; but when the punch is reciprocated downward and meets the die, as hereinafter explained, the stripper-plate is forced upward against the tension of the springs 67, and when the punch is withdrawn from the die the stripper-plate again resumes its normal position at the lower end of the punches, and thereby strips from the punches the material which has just been punched out. The stripper-plate is limited in its downward movement by the abutment of the pin-heads 65ᵃ against the smaller portion of the recess 66.

The die consists of a plate 70, which is firmly fastened on the base-block 20, which plate is punched out with matrices 71 (see Fig. 9) of the same shape and configuration as the punches 63, the die-plate being so alined that the punch will fit the die accurately on the downward movement of the punch through the die.

*Work-support.*—Below the under surface of the die-plate 70 (see Fig. 2) is a work-support comprising a block 80 and a removable capping 81. In the space between said capping 81 and the under surface of the die-plate 70 the work is to be inserted, being guided laterally by side pieces 82. The work in this case is shown in Fig. 9 as a tablet 83, and in the operation of the machine material, such as paper, is fed between the punches 63 and the die 70 in a manner to be hereinafter described, and the punched-out characters are carried downward through the die and pressed upon the tablet 83 below. The capping 81 consists of a lower plate 84, to which is fastened an upper plate 85, (see Fig. 3,) and in a recess 86 between these two plates is attached a spring 86ᵃ, which presses upward against the under surface of the die-plate 70 and holds the capping in position. The capping is further held in position by means of pins 87, which project downwardly from the plate 84 into sockets 88 in the block 80. Attached to the upper surface of the plate 85 is a layer of resilient material 89, which serves as a cushion for the work to rest upon.

In order that the work may be held firmly in position against the under surface of the die-plate 70, I have provided means for reciprocating the work-support to and from the under surface of the die-plate. The block 80 (see Fig. 2) has formed in it a recess 90, and extending between the inner surfaces of this recess and fast to the block is a tranverse bar 91, to which is pivoted a lever 92. This lever 92 is pivoted at its central portion upon a bar 93, fast to the base-block 20, and on the outer end of its rearwardly-extending arm is formed a socket 95. Fast to and extending rearwardly from the cross-head 51 is a horizontal arm 96, and projecting downward from this arm is a hollow cylinder 97, within which slides a plunger 99, provided at its outer end with a cup-shaped head 98, adapted to fit into the socket 95. The plunger slides upwardly within the cylinder 97 against the tension of a strong spring 99ᵃ. On the downward movement of the cross-head 51 the plunger 99 is also carried downward and when the cup-shaped head 98 becomes seated in the socket 95 the lever 92 is rocked about its pivot 93, and the work-support block 80 is thereby carried upward and the work is forced against the under side of the die-plate 70, the amount of this upward pressure depending upon the tension of the spring 99ᵃ. In order to permit this vertical movement of the ends of the lever 92, it is of course necessary that the pivotal bearing in the lever should be slightly elongated laterally in such manner as to allow a slight lateral play in the space 93ᵃ between the pivotal bar 93 and the lever 92. A spring 94 holds the rear arm of the lever 92 normally in an upward position, and the work-support block 80 is thereby normally held in downward position, so that the work may freely be inserted into the space between the capping 81 and the die-plate 70.

*Feed mechanism.*—The feed mechanism comprises a laterally-movable carriage adapted to have clamped upon it the material to be punched out, and the construction of this carriage, the means of shifting it laterally to carry the material across the surface of the die, and the means of locking and unlocking it are now to be described. Fast upon the opposite sides of the base-block 20 are supporting-frames 110, over the upper surface of which slides the carriage 111. (See Figs. 1, 5, and 9.) This carriage has a bottom plate 112 (see Fig. 2) so shaped as to fit in and slide between the die-plate 70 and the base-block 20. This plate 112 is of any desired length sufficient to carry a long strip of the material which is to be fed across the die, and this material is attached to the carriage by means of a series of clamps 113. Each of these clamps consists of two small end pieces 114, pivoted upon a transverse bar 115, which runs the entire length of the carriage 111 and is attached thereto by a series of small posts 116. The two end pieces 114 are connected at their upper ends by a transverse tie-bar 117 and at their lower ends by a transverse clamping-bar 118, which rests flat upon the bottom plate 112 of the carriage 111, and by means of a spring 119 this bar 118 is held firmly down against the bottom plate 112 in such manner as firmly to clamp against the plate any material, such as paper, which is interposed therebetween.

The mechanism for laterally feeding the carriage 111 is as follows: Pivoted to the horizontal arm 96, Fig. 2, is a link 120, the lower end of which carries a bolt 121, which passes through a slot 122 in an arm 123, which arm is fast upon a collar 124, journaled upon a transverse supporting-shaft 125. The bolt 121 may be adjusted in the slot 122 and secured to the arm by means of a nut 126, Fig. 5, and thereby on the reciprocating movement of the arm 96, carried by the cross-head 51, as hereinbefore described, the arm 123 is rocked first downward and then upward, and the collar 124 is rocked upon the shaft 125, the amount of this rocking movement depending, of course, on the adjustment of the bolt 121 within the slot 122. Fast upon the outer end of the collar 124 is a gear-wheel 126, (see Fig. 4,) which meshes with an intermediate pinion 127, fast upon a gear-wheel 128, which gear-wheel 128 meshes with a gear-wheel 129, mounted loosely upon a supporting-shaft in the side frame 21. Meshing with this gear-wheel 129 is a vertical rack-bar 130, which slides in guide-plates 131, attached to the side frame 21. It is thus evident that on the downward movement of the cross-head 51 and the arm 96 the gear-wheel 126 is partially rotated in the direction shown by the full-line arrow, Fig. 4, and a similar partial rotation is imparted to the gear-wheel 129 by means of the intermediate wheel 128, thereby carrying upward the rack-bar 130, and on the upward movement of the cross-head 51 the gear-wheel 126 is rotated backward in the direction shown by the dotted arrow, and the rack-bar 130 is correspondingly carried downward. Fast upon the lower part of the rack-bar 130 is a block 132, Fig. 1, which has pivoted upon it at 133 a feed-pawl 134. This feed-pawl 134 has an inclined face 135 and a tail 136, which tail is normally held against the block 132 by means of the spring 137. On the upward movement of the rack-bar 130 the pawl 134 is carried upward and the inclined face 135 comes in contact with one of a series of pins 140, fast upon and projecting laterally rearward from the sliding carriage 111. This inclined face 135 thus cams the pin 140 to the side, imparting a lateral movement to the carriage, and therefore feeding along the material to be punched. The pins 140 are so spaced upon the carriage 111 that when one pin is cammed laterally the required distance by the pawl 134 a new pin is brought into position to be likewise acted upon and cammed the same distance laterally upon the next upward movement of the pawl 134. It is thus obvious that if this new pin is to be brought into such operative position when the pawl is at the limit of its upward movement the under side of the pawl will naturally in the course of its downward movement strike this next pin; but since the pawl is revoluble in this direction on its pivot the head of the pawl may be freely rocked to the left by the pin, thus carrying the tailpiece 136 away from the block 132 until the pawl has passed the pin, when it snaps into normal position by means of the spring 137, ready to cam the pin laterally on the next upward stroke of the pawl. It is thus seen that the carriage is shifted laterally only during the upward stroke of the rack-bar 130 and remains at rest during the downstroke of said bar.

After the carriage 111 is slid along laterally on the downward movement of the punch it becomes necessary to lock the carriage firmly in position while the punch is perforating the material carried upon the carriage and then to unlock the carriage just prior to the lateral feeding movement. This is accomplished by mechanism shown in Figs. 4, 9, and 10. The gear-wheel 129 has fast upon it a cam-disk 150, having a cam projection 151. Adjacent to and acted upon by this cam projection 151 is a pawl 152, Fig. 10, which is pivoted upon a pin 153 at the extremity of a short arm 154, which method of pivoting allows the pawl 152 to have a lateral swinging movement, and the pawl is held in its outward position by means of a spring 155, coiled upon a headed pin 156, which pin projects through a hole in said pawl and at its headed end abuts against the side frame 21. The arm 154 is fast upon the inner end of a dog 157, the nose 158 at the outer end of which dog normally bears against a stud 160, Figs. 4 and 9. This stud 160 is fast upon a locking-pin 161, which is seated in a socket 162 within a plate 163, fast to the base-plate 20. The locking-pin 161 is normally forced outward by a spring 164 within the socket and is thereby forced into the locking-notches 165, formed on the rear side of the bottom plate 112 of the carriage 111, whenever the carriage is so shifted laterally as to bring any one of these notches opposite the pin 161. By this means this pin serves to lock the carriage from lateral movement when it projects into one of these notches. The unlocking of the carriage is effected by means of the dog 157, as follows: When the gear-wheel 129 is rotated in the direction shown by the full-line arrow, Figs. 4 and 10, (upon the downward movement of the cross-head and punch, as hereinbefore described,) the cam 151 forces forward the pawl 152, and thereby forces rearward the dog 157, and the nose 158 of the dog then presses the stud 160 rearward, thus carrying the pin 161 out of engagement with the notch 165. As soon as the cam 151 has cleared the pawl 152 the pressure on the dog is of course released, and the pin 161 is again forced outward by its spring 164, and since during this rotary movement of the cam 151 the carriage 111 has in the meantime been moved laterally, as hereinbefore explained, a new notch is brought opposite the pin 161, and the pin thereupon is forced into this notch and again locks the carriage, the notches 165 being spaced the same distance as the laterally-projecting pins 140. Now when the gear-wheel is given its opposite rotation, as shown by the dotted arrow, (on the upward movement of the cross-head and punch, as hereinbefore described,) it is necessary still to keep the carriage locked from lateral movement, the carriage not being fed at this period. For this purpose the pawl 152 is provided at its outer end with a beveled surface 170, and the cam 151 has at its lower end a correspondingly-beveled surface 171, the result of which is that upon the backward rotation of the cam 151 the beveled surface 171 of the cam strikes the beveled surface 170 of the pawl 152 and forces the pawl laterally against the tension of the spring 155 without forcing the pawl forward in such manner as to rock the dog 157 rearward. It is thus obvious that the dog 157 is not rocked rearwardly on the upward movement of the punch, being unaffected by the cam 151 during this part of the stroke, it thereby resulting that the sliding carriage 111 remains locked from movement during such upward stroke of the punch; but on the downward stroke of punch the carriage is again unlocked by reason of the dog 157 forcing rearward the pin 161 in the manner just described.

*Stop-motion.*—I will now describe the stop-motion (see Figs. 5 and 8) by means of which the driving-wheel 30 may be connected to and disconnected from the shaft or driven member 40 and whereby the punch receives one or more complete strokes downward and upward.

The shaft 40 has fast upon it and adjacent to the driving-wheel 30 a collar 200, in the front face of which is formed a sector-shaped recess or notch 201. The driving-wheel 30 has seated in one portion of its hub a clutch-pin or propelling-pin 202, which is spring-pressed outward toward the said collar 200 by means of a spring 203. This pin 202 has formed in its lower side a notch 204, into which fits a locking-pin 205, seated within one of the spokes 206 of the driving-wheel 30 (see Fig. 7) and sliding longitudinally within said spoke and spring-pressed toward the hub of the driving-wheel 30 by means of the spring 207. It is thus seen that this locking-pin 205 projecting into the notch 204 of the pin 202 holds said pin 202 in its inward position; but when the pin 205 is pulled downward in the manner to be hereinafter described the pin 202 is set free and thereupon springs outward toward the collar 200. As will be seen hereinafter, this releasing of pin 202 takes place when said pin is at its lowest position during the course of its revolution, and since the collar 200 is made fast upon the shaft 40 in such manner that the recess 201 is also in its lowest position (and is therefore opposite the said pin 202) when the punch is in its normal upward position at rest it thereby results that as soon as pin 202 is released it will enter the recess 201 and in the course of its rotation will immediately abut against the radial wall 208, formed in the collar 200 by the said recess 201, and will therefore carry the said collar, and consequently the shaft 40, round with the driving-wheel 30 in its rotation, thus reciprocating the punch, as before described. The means of freeing this pin 202 to effect the engagement thus described is shown in Fig. 8 and comprises a block 210, in which is formed a slot 211, through which slot projects the guide-pin 212, screwed firmly into the side frame 21, and depending from the lower side of this block is the arm 213, which projects downward through a hole in the bracket 214, fast to the side frame 21. Fast to this arm 213 and below said bracket 214 is the arm 215, to which is attached a cord 216. On pulling the cord 216 downward the block 210 is also drawn downward against the tension of the spring 217, coiled around the arm 213 between said block 210 and the bracket 214, the slot-and-pin connection serving as an extra guide for the block. The block 210 is formed at its upper end with a combined flange 220 and cam-surface 221, the purpose of which is to free the propelling-pin 202 and to force it back into position again. The pin 205 has a laterally-projecting beveled lug 222, (see Fig. 7,) and when the block 210 is pulled downward in the manner just described this lug 222 comes in contact with the under surface of the flange 220 and is thereby forced downward. The pin 205 is thereupon forced from the notch 204, and the pin 202 is released to engage the collar 200 in the manner previously described. As soon as this has taken place the shaft 40 begins to rotate with the driving-wheel 30, and thereupon the operator may release the cord 216 and allow the block 210 to slide upward to its normal position. When the shaft 40 has nearly completed a single revolution in this manner, the lip 223, projecting downward from the pin 202, comes in contact with the cam-surface 221, and, as is seen in Fig. 8, the shape of this cam-surface is such that the pin 202 will thereby be slowly forced inward until the pin 205 again engages in the notch 204 and locks the pin 202 in its inward position.

The shape of the cam-surface 221 is such that the disconnection of the pin 202 from the radial wall 208 of the collar 200 takes place at the end of a single complete revolution of the shaft 40. Of course if the operator does not release the cord 216 after having pulled it downward, but holds it in a downward position, the cam-surface 221 is then below the path of travel of the lip 223 on the pin 202, and the pin 202 is therefore not forced inward at the end of a complete revolution of the shaft 40, but remains in engagement with the collar 200, the result being that the shaft 40 is continually rotated with the driving-wheel 30 and is only disconnected therefrom upon the releasing of the cord 216 in the manner just described.

*Operation of the machine.*—In the general operation of the machine the material to be stamped out is first clamped down upon the moving carriage 111 in the manner described, and the carriage is drawn to its outermost right-hand position on the supporting-frames 110. The piece of work to which the punched-out material is to be secured is then inserted between the guide-pieces 82 and upon the work-support 81. The operator having first started the main driving-wheel 30 by means of the electric motor upon shaft 25 or other suitable driving means then pulls down upon the cord 216 long enough to engage the clutch mechanism as described and then releases the cord. Thereupon the shaft 40 is given one complete rotation and the punch 63 is reciprocated downward and upward one complete stroke. At the beginning of this stroke the carriage 111 is first unlocked by means of the dog 157 forcing rearward the locking-pin 161, and the carriage is then fed along by means of the feed-pawl 134, so that the material is carried into the path of the punch. The movement of the carriage is enough to bring a new notch 165 opposite the locking-pin 161, so that the carriage is again locked, and at this point the punch is still on its downward stroke and just ready to enter the die, and upon the continuation of this downward stroke the punch cuts out the material and forces the cut-out configuration through the die and upon the surface of the work below, and at the same time the work-support is forced slightly upward to clamp the work against the punch in the manner described. If the material carried upon the carriage is furnished with an adhesive substance on its under side, the work may be slightly moistened on its upper side before insertion into the machine, and it is thus obvious that the material upon being pressed down on the work in the manner described will then adhere firmly thereto. Upon the upstroke of the punch the work-support is reciprocated downward, so that the work may be freely removed; but the material-carriage still remains locked and is not fed during this upstroke of the punch. As soon as the punch has started on its upward stroke the operator may withdraw the first piece of work and insert another piece of work in place of it. Then upon pulling the cord 216 in the same manner the carriage 111 is again fed along, thus bringing new material into the path of the punch, and the same operation is repeated. It is also obvious that the operator may hold the cord 216 down continually, whereupon the punch will be continually reciprocated and the operator may insert and withdraw a new piece of work for each reciprocation of the punch.

I claim—

1. In a punching-machine, the combination with a punch and a die, of a work-support, operating means for actuating said support to press work against the under side of said punch, and resilient means intermediate said work-support-operating means and the work.

2. In a punching-machine, the combination with a punch and a die, of a work-support below said die, and a lever connected with said support and positioned to be struck by said punch at an intermediate portion of its stroke for reciprocating said support.

3. In a punching-machine, the combination with a punch and a die, of a work-support below said die, and a resilient means connected with said punch for operating upon said support at an intermediate portion of the stroke of said punch to impart a yielding pressure of said support toward said punch.

4. In a punching-machine, the combination with a punch and a die, of a carriage for carrying material between the punch and the die, means for positively feeding said carriage at one period of the stroke of said punch, and means for locking said carriage from movement in either direction during the entire remaining portion of the stroke of said punch.

5. In a punching-machine, the combination with a punch and a die, of a carriage for carrying material between the punch and the die, means operated by the punch for feeding said carriage during one portion of the stroke of the punch, and independent means for locking said carriage during the entire remaining portion of the stroke of the punch.

6. In a punching-machine, the combination with a punch and a die, of a carriage for carrying material between the punch and the die, means operated by the punch for feeding said carriage during one portion of the stroke of the punch, independent means for locking said carriage during the entire remaining portion of the stroke of the punch, and means operated by the punch for unlocking said carriage just prior to its feeding movement imparted to it by the punch.

7. In a punching-machine, the combination with a stationary die and a movable punch, of a reciprocatory work-support below said die, an automatically-locking carriage to feed material across the upper surface of said die, and means connected with said movable punch for successively unlocking said carriage, feeding the same and reciprocating said work-support.

8. In a punching-machine, the combination with a stationary die and a movable punch, of a work-support below said die, an automatically-locking carriage for feeding material across the upper surface of said die, a gear-wheel operated by said movable punch, a pawl operated by said gear-wheel to unlock said material-carriage, a rack-bar operated by said gear-wheel, and a carriage-feed operated by the rack-bar.

9. In a punching-machine, the combination with a stationary die and a movable punch, of a work-support below said die, a lever connected with said work-support, and a spring-pressed plunger connected with said punch and engaging said lever to reciprocate said work-support at an intermediate portion of the stroke of said punch.

10. In a punching-machine, the combination with a stationary die and a movable punch, of a carriage for carrying material between the punch and the die, a lock for said carriage, a pawl for operating upon said lock to release said carriage, gearing having provisions for operating said pawl, a rack-bar connected with said gearing and having devices for feeding said carriage, and an arm connected with said punch and having adjustable provisions connecting the same with said gearing to control the extent of feed of said carriage.

11. In a punching-machine, the combination with a stationary die and a movable punch, of a carriage for carrying material between the punch and the die, a lock for said carriage, a pawl for operating upon said lock to release said carriage, gearing having provisions for operating said pawl, a rack-bar connected with said gearing and having devices for feeding said carriage, an arm connected with said punch and having adjustable provisions connecting the same with said gearing to control the extent of feed of said carriage, a work-support below said die, a lever connected with said support, and a spring-pressed plunger connected with said arm for actuating said lever to reciprocate said work-support.

12. In a punching-machine, the combination with a stationary die and a movable punch, of a carriage for feeding material between said punch and said die, a locking-plunger for engaging said carriage to lock the same intermittently, a pawl for engaging said plunger to unlock the carriage, gearing having cam provisions for operating said pawl to unlock the carriage, an arm connected with said punch and having a crank connection with said gearing, a rack-bar connected with said gearing and having reciprocatory motion attendant upon the reciprocation of the punch, and a pawl carried by said rack-bar for engaging said carriage and feeding the same intermittently.

In testimony whereof I affix my signature in the presence of two witnesses.

FREDERICK J. NUTTING.

Witnesses:
H. C. WOOD,
J. B. HAYWARD.